United States Patent
Willberg et al.

(10) Patent No.: US 7,482,311 B2
(45) Date of Patent: *Jan. 27, 2009

(54) SELF-DESTRUCTING FILTER CAKE

(75) Inventors: Dean Willberg, Moscow (RU); Keith Dismuke, Katy, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/419,410

(22) Filed: May 19, 2006

(65) Prior Publication Data

US 2006/0229212 A1      Oct. 12, 2006

Related U.S. Application Data

(62) Division of application No. 10/605,687, filed on Oct. 17, 2003, now Pat. No. 7,265,079.

(60) Provisional application No. 60/421,696, filed on Oct. 28, 2002.

(51) Int. Cl.
*E21B 43/02* (2006.01)
*C09K 8/88* (2006.01)

(52) U.S. Cl. .................... 507/267; 166/276; 166/244.1; 507/200; 507/203

(58) Field of Classification Search ................. 166/276, 166/244.1; 507/267, 203, 200
See application file for complete search history.

(56) References Cited

U.S. PATENT DOCUMENTS

| 4,585,482 | A | 4/1986 | Tice et al. |
| 4,957,165 | A | 9/1990 | Cantu et al. |
| 4,986,354 | A | 1/1991 | Cantu et al. |
| 5,325,921 | A | 7/1994 | Johnson et al. |
| 6,645,769 | B2 * | 11/2003 | Tayebi et al. .................. 436/56 |
| 6,817,414 | B2 | 11/2004 | Lee |
| 7,166,560 | B2 * | 1/2007 | Still et al. ................... 507/219 |

* cited by examiner

*Primary Examiner*—Timothy J Kugel
(74) *Attorney, Agent, or Firm*—David Cate; Robin Nava; Dale Gaudier

(57) ABSTRACT

A composition and method are given for self-destructive fluid loss additives and filter cakes in wellbores and subterranean formations. The fluid loss additives and filter cakes are formed from a mixture of particulate solid acid-precursors, such as a polylactic acid or a polyglycolic acid, and particulate solid acid-reactive materials, such as magnesium oxide or calcium carbonate. In the presence of water, the solid acid-precursors hydrolyze and dissolve, generating acids that then dissolve the solid acid-reactive materials. The composition is used in oilfield treatments such as drilling, completion and stimulation where it disappears when it is no longer needed without the use of mechanical means or injection of additional fluids.

19 Claims, 1 Drawing Sheet

SELF-DESTRUCTING FILTER CAKE

CROSS REFERENCE TO RELATED APPLICATIONS

This application is a divisional of the non-provisional application filed Oct. 17, 2003 under application Ser. No. 10/605,687, now U.S. Pat. No. 7,265,079, issued Sep. 4, 2007, and claims the benefit of U.S. Provisional Patent Application No. 60/421,696, filed on Oct. 28, 2002.

BACKGROUND OF INVENTION

This invention relates to a composition and method for generating self-destructing filter cakes in wellbores and in subterranean formations. More particularly it relates to a composition and method for injection of solids-containing fluids that form filter cakes in which acids are generated after the filter cakes have been placed. Finally, it relates to using the composition and method in oilfield applications.

There are many oilfield applications in which filter cakes are needed in the wellbore, in the near-wellbore region or in one or more strata of the formation. Such applications are those in which without a filter cake fluid would leak off into porous rock at an undesirable rate during a well treatment. Such treatments include drilling, drill-in, completion, stimulation (for example, hydraulic fracturing or matrix dissolution), sand control (for example gravel packing, frac-packing, and sand consolidation), diversion, scale control, water control, and others. Typically, after these treatments have been completed the continued presence of the filter cake is undesirable or unacceptable.

Solid, insoluble, materials (that may be called fluid loss additives and filter cake components) are typically added to the fluids used in these treatments to form the filter cakes, although sometimes soluble (or at least highly dispersed) components of the fluids (such as polymers or crosslinked polymers) may form the filter cakes. Removal of the filter cake is typically accomplished either by a mechanical means (scraping, jetting, or the like), by subsequent addition of a fluid containing an agent (such as an acid, a base, or an enzyme) that dissolves at least a portion of the filter cake, or by manipulation of the physical state of the filter cake (by emulsion inversion, for example). These removal methods usually require a tool or addition of another fluid (for example to change the pH or to add a chemical). This can sometimes be done in the wellbore but normally cannot be done in a proppant or gravel pack. Sometimes the operator may rely on the flow of produced fluids (which will be in the opposite direction from the flow of the fluid when the filter cake was laid down) to loosen the filter cake or to dissolve the filter cake (for example if it is a soluble salt). However, these methods require fluid flow and often result in slow or incomplete filter cake removal. Sometimes a breaker can be incorporated in the filter cake but these must normally be delayed (for example by esterification or encapsulation) and they are often expensive and/or difficult to place and/or difficult to trigger.

There is a need for a new composition and method in which a filter cake is formed from at least two components, one of which slowly reacts with water, and the second of which reacts with a reaction product of the first to destroy the filter cake spontaneously.

SUMMARY OF INVENTION

One embodiment is an oilfield treatment composition including first a solid that is one or more of lactide, glycolide, polylactic acid, polyglycolic acid, copolymers of polylactic acid and polyglycolic acid, copolymers of glycolic acid with other hydroxy-, carboxylic acid-, or hydroxycarboxylic acid-containing moieties, copolymers of lactic acid with other hydroxy-, carboxylic acid-, or hydroxycarboxylic acid-containing moieties, and mixtures of the preceding, and second a solid that reacts with an acid. We will call the former a "solid acid-precursor"and the latter a "solid acid-reactive material". In another embodiment, the solid acid-reactive material is capable of at least partially dissolving in an aqueous fluid. In yet another embodiment, the solid acid-reactive material promotes the formation of acid from the solid acid-precursor. In another embodiment of the Invention, solid particles or fibers or other shapes of the solid acid-precursors of the Invention are formed that include other materials, useful in oilfield treatments, for example solid acid-reactive materials such as calcium carbonate, aluminum hydroxide, magnesium oxide, calcium oxalate, calcium phosphate, aluminum metaphosphate, sodium zinc potassium polyphosphate glass, and sodium calcium magnesium polyphosphate glass. The solid acid-precursor in the oilfield treatment composition, including an embodiment in which it is mixed with or contains other materials, may be coated or encapsulated.

Methods of the Invention include Incorporation of solid acid-precursors and acid-reactive materials in treatment fluids to form filter cakes in drilling, drill-in and completion treatments, in hydraulic fracturing treatments, in diversion treatments, in scale control treatments, in water control treatments, in matrix dissolution treatments, in sand consolidation treatments, in frac-packing treatments, and in gravel packing treatments such that delayed acid generation occurs to delay at least part of the filter cake after the drilling, completion, fracturing, diversion or sand control treatment. Other embodiments include using the solid acid-precursors and the solid acid-reactive materials in combination as components of fluid loss additives that generate acid, after their use, to destroy some or all of the fluid loss additive. Other embodiments include using the solid acid-precursors and solid acid-reactive materials in combination as components of drilling fluids, drill-in fluids, completion fluids, diversion fluids, and stimulation fluids such that the solid acid-precursors form part of the filter cake and then form acids in the filter cake to react with the solid acid-reactive materials to destroy some or all of the filter cake after a suitable delay.

DETAILED DESCRIPTION

Figure 1:
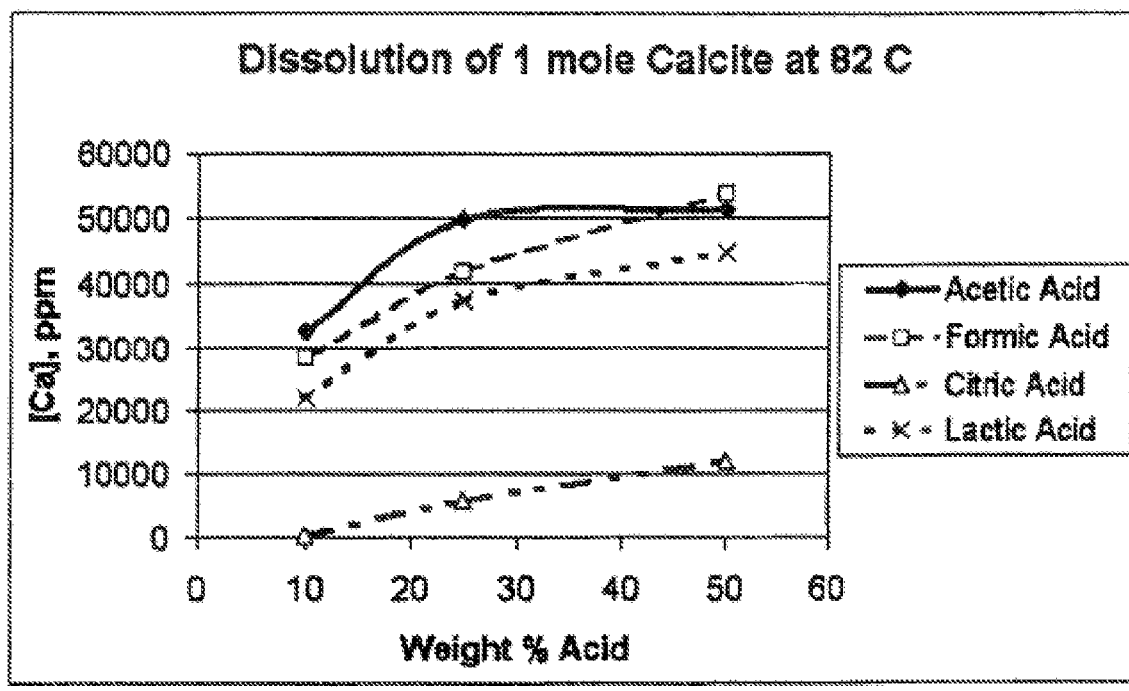
FIG. 1 shows the ability of various organic acids to dissolve calcite.

Excellent sources of acid that can be generated downhole when and where it is needed are solid cyclic dimers, or solid polymers, of certain organic acids, that hydrolyze under known and controllable conditions of temperature, time and pH to form the organic acids. We will call these solid materials "acid-precursors" and we will call the formation of acid downhole "delayed acid generation". One example of a suitable solid acid-precursor is the solid cyclic dimer of lactic acid (known as "lactide"), which has a melting point of 95 to 125° C., (depending upon the optical activity). Another is a polymer of lactic acid, (sometimes called a polylactic acid (or "PLA"), or a polylactate, or a polylactide). Another example is the solid cyclic dimer of gylycolic acid (known as "glycolide"), which has a melting point of about 86° C. Yet another example is a polymer of glycolic acid (hydroxyacetic acid), also known as polyglycolic acid ("PGA"), or polyglycolide. Another example is a copolymer of lactic acid and glycolic acid. These polymers and copolymers are polyesters.

Cargill Dow, Minnetonka, Minn., USA, produces the solid cyclic lactic acid dimer called "lactide" and from it produces lactic acid polymers, or polylactates, with varying molecular weights and degrees of crystallinity, under the generic trade name NATUREWORKS™ PLA. The PLA's currently available from Cargill Dow have molecular weights of up to about 100,000, although any polylactide (made by any process by any manufacturer) and any molecular weight material of any degree of crystallinity may be used in the embodiments of the Invention. The PLA polymers are solids at room temperature and are hydrolyzed by water to form lactic acid. Those available from Cargill Dow typically have crystalline melt temperatures of from about 120 to about 170° C., but others are obtainable. Poly(d,l-lactide) is available from Bio-Invigor, Beijing and Taiwan, with molecular weights of up to 500,000. Bio-Invigor also supplies polyglycolic acid (also known as polyglycolide) and various copolymers of lactic acid and glycolic acid, often called "polyglactin" or poly(lactide-co-glycolide). The rates of the hydrolysis reactions of all these materials are governed by the molecular weight, the crystallinity (the ratio of crystalline to amorphous material), the physical form (size and shape of the solid), and in the case of polylactide, the amounts of the two optical isomers. (The naturally occurring l-lactide forms partially crystalline polymers; synthetic dl-lactide forms amorphous polymers.) Amorphous regions are more susceptible to hydrolysis than crystalline regions. Lower molecular weight, less crystallinity and greater surface-to-mass ratio all result in faster hydrolysis. Hydrolysis is accelerated by increasing the temperature, by adding acid or base, or by adding a material that reacts with the hydrolysis product(s).

Homopolymers can be more crystalline; copolymers tend to be amorphous unless they are block copolymers. The extent of the crystallinity can be controlled by the manufacturing method for homopolymers and by the manufacturing method and the ratio and distribution of lactide and glycolide for the copolymers. Polyglycolide can be made in a porous form. Some of the polymers dissolve very slowly in water before they hydrolyze.

Other materials suitable as solid acid-precursors are all those polymers of hydroxyacetic acid (glycolic acid) with itself or other hydroxy-, carboxylic acid-, or hydroxycarboxylic acid-containing moieties described in U.S. Pat. Nos. 4,848,467; 4,957,165; and 4,986,355.

In many oilfield applications, fluid loss additives and filter cakes are needed during a treatment, but after the treatment it is desirable that the fluid loss additive or filter cake be substantially gone. To make fluid loss additives and filter cake components, acid-soluble or acid-reactive materials, such as but not limited to magnesia, aluminum hydroxide, calcite, calcium oxalate, calcium phosphate, aluminum metaphosphate, sodium zinc potassium polyphosphate glass, and sodium calcium magnesium polyphosphate glass are mixed with or incorporated into, solid acid-precursors, such as cyclic ester dirners of lactic acid or glycolic acid or homopolymers or copolymers of lactic acid or glycolic acid. These fluid loss additives and filter cake components are added to fluids Injected into the subsurface in oilfield operations. At least a portion of the solid acid-precursors slowly hydrolyzes at controllable rates to release acids at pre-selected locations and times. The acids then react with and dissolve at least a portion of the acid-reactive materials. The result is that at least a portion of both the solid acid-precursor and the acid-reactive solid material dissolve. We will term this "self-destruction" of the mixture. This feature of these materials is used to improve many oilfield treatments. Preferably most or all of the solid material initially added is no longer present at the end of the treatments. It is not necessary either for all of the solid acid-precursor to hydrolyze or for all of the solid acid-reactive material to dissolve. It is necessary only that a sufficient amount of either no longer be a solid portion of the filter cake so that the filter cake no longer forms a deleterious barrier to fluid flow.

Mixtures of one or more solid acid-precursors and one or more solid acid-reactive materials may be purely physical mixtures of separate particles of the separate components. The mixtures may also be manufactured such that one or more solid acid-precursors and one or more solid acid-reactive materials is in each particle; this will be termed a "combined mixture". This may be done, by non-limiting examples, by coating the acid-reactive material with the solid acid-precursor, or by heating a physical mixture until the solid acid-precursor melts, mixing thoroughly, cooling, and comminuting. For example, it is common practice in industry to co-extrude polymers with mineral filler materials, such as talc or carbonates, so that they have altered optical, thermal and/or mechanical properties. Such mixtures of polymers and solids are commonly referred to as "filled polymers". When the solid acid-reactive material is completely enclosed within the solid acid-precursor, the solid acid-reactive material may be water-soluble, for example boric acid or borax. In any case it is preferable for the distribution of the components in the mixtures to be as uniform as possible. The relative amounts of the components may be adjusted for the situation to control the solid acid-precursor hydrolysis rate and the rate and extent of dissolution of the solid acid-reactive material. The most important factors will be the temperature at which the treatment will be carried out, the composition of the aqueous fluid or fluids with which the mixture will come into contact, and the time desired for dissolution of the mixture.

The solid acid-precursors or the mixtures of solid acid-precursors and solid acid-reactive materials may be manufactured in various solid shapes, including, but not limited to fibers, beads, films, ribbons and platelets. The solid acid-precursors or the mixtures of solid acid-precursors and solid acid-reactive materials may be coated to slow the hydrolysis further. Suitable coatings include polycaprolate (a copolymer of glycolide and epsilon-caprolactone), and calcium stearate, both of which are hydrophobic. Polycaprolate itself slowly hydrolyzes. Generating a hydrophobic layer on the surface of the solid acid-precursors or the mixtures of solid acid-precursors and solid acid-reactive materials by any means delays the hydrolysis. Note that coating here may refer to encapsulation or simply to changing the surface by chemical reaction or by forming or adding a thin film of another material. Another suitable method of delaying the hydrolysis of the solid acid-precursor, and the release of acid, is to suspend the solid acid-precursor, optionally with a hydrophobic coating, in an oil or in the oil phase of an emulsion. The hydrolysis and acid release do not occur until water contacts the solid acid-precursor.

An advantage of the composition and method embodiments of the Invention is that, for a given oilfield treatment, the appropriate solid acid-precursor and solid acid-reactive material may be selected readily from among many available materials. The rate of acid generation from a particular solid acid-precursor or a particular mixture of a solid acid-precursor and a solid acid-reactive material, having a particular chemical and physical make-up, including a coating if present, at a particular temperature and in contact with a fluid or fluids of a particular composition (for example pH and the concentration and nature of other components, especially electrolytes), is readily determined by a simple experiment: exposing the acid-precursor to the fluid or fluids under treatment conditions and monitoring the release of acid. The rate of solid acid-reactive material dissolution is governed by similar factors (such as by the choice of solid acid-reactive material, the ratio of materials, the particle size, calcining and coating of solid acid-reactive material) and may readily and easily be determined by similar experiments. Naturally, a solid acid-precursor is selected that a) generates acid at the desired rate (after a suitable delay if needed) and b) is compatible with and does not interfere with the function of other components of the fluid. An acid-reactive material is selected that dissolves in the evolving fluid at a suitable rate and is compatible with the function of other components of the fluid. This is done for all of the methods described below.

The mixture self-destructs in situ, that is, in the location where it is placed. That location may be part of a suspension in a treatment fluid in the wellbore, in the perforations, in a gravel pack, or in a fracture: or as a component of a filter cake on the walls of a wellbore or of a fracture; or in the pores of the formation itself. The mixture may be used in carbonates and sandstones. If the formation is significantly acid soluble, the amount of mixture, or the amount of solid acid-precursor in the mixtures, may be adjusted to account for consumption of acid in reaction with the formation. In use, even though the particles are intended to become part of a filter cake, they may end up in other places, where they are normally undesirable because they impede fluid flow, so in all locations self-destruction is desired.

The particle sizes of the individual components of the mixture may be the same or different. The particle sizes of the individual components of the mixture or of the combined mixture, as they relate to the use as a fluid loss additive and as filter cake former components, depend primarily upon the pore size distribution of the rock onto which the filter cake is to be deposited and whether or not it is intended to eliminate or just to reduce fluid loss. Criteria for, and methods of, choosing the optimal particle sizes or particle size distributions for conventional fluid loss additives and filter cake components are well known. Other particle sizes may be chosen for embodiments of the current Invention; particle sizes or size distributions may be selected as a compromise between those that are optimal for fluid loss control or filter cake formation and those that are optimal for self-destruction at the desired time and rate. The rate of self-destruction can readily be measured in the laboratory in a given fluid at a given temperature.

A particular advantage of these materials is that the solid acid-precursors and the generated acids are non-toxic and are biodegradable. The solid acid-precursors are often used as self-dissolving sutures.

The mixtures of solid acid-precursors and solid acid-reactive materials are used as fluid loss additives, optionally in combination with other materials, as components of filter-cake forming compositions. Mixtures in the form of particulates, fibers, films, ribbons or other shapes are added to the drilling, completion, or stimulation fluid to prevent or minimize leakoff during reservoir drilling, drill-in, or stimulation operations but in the long term they dissolve and eventually clean up without an additional treatment step. Furthermore, if the mixture is formulated so that it generates acid In excess of that required to dissolve the acid-reactive component, then the excess acid produced by hydrolysis stimulates the formation, if it contains acid-soluble material, by etching either the surface of naturally occurring fractures or the face of the formation at the wellbore. Such mixtures that generate extra acid are particularly useful for drilling, "drill-in", and stimulation operations carbonate reservoirs, especially in fractured carbonate reservoirs. Also, an appropriate amount of buffer may be added to the fluid or to the particles to counteract the effects of acid being generated by premature hydrolysis of the solid acid-precursor.

Similarly, a self-destructing fluid leak-off and filter cake forming additive is made for drilling, completions, wellbore intervention and fracturing operations. A self-destructing drill-in fluid includes a mixture of the solid acid-precursor and an acid-soluble particulate material, such as but not limited to $CaCO_3$, aluminum hydroxide, or magnesia. This fluid creates a chemically metastable filtercake that prevents fluid leakoff and formation damage during the drilling process but readily cleans up over time. As the solid acid-precursor hydrolyzes it forms an acid that attacks the carbonate or other particles and, since the solid acid-precursor and carbonates or other materials are intermingled during deposition, the cleanup process is uniform and extensive. In particularly preferred embodiments, the acid-soluble material has a high solubility in the in situ generated acid, that is, a given amount of the acid dissolves a large amount of the acid-soluble material.

In hydraulic fracturing, frac-packing, and gravel packing embodiments, the solid acid-precursor may be added in the pad, throughout the treatment or to only some of the proppant or gravel stages. The solid acid-precursor or mixture may be a fiber in any of these uses and will retard flowback of proppant or gravel, and/or of fines if they are present, until the solid-acid-precursor hydrolyzes and the mixture dissolves. A self-destructing fluid loss additive and filter cake is particularly useful in hydraulic fracturing, frac-packing, and gravel packing because mechanical removal methods are impossible and methods involving contacting the fluid loss additive and filter cake with an additional fluid are not practical, For example, calcite is known to be an excellent fluid loss additive, but calcite is not soluble in water, even at 150° C. Calcite has been used for years in drilling fluids to form filter cakes that are subsequently removed with acid. Furthermore, solid acid-precursors such as polyglycolic acid soften and deform at high temperatures, whereas particles of materials such as magnesium oxide are hard. The deformation of the softened polyglycolic acid traps the magnesium oxide and makes it an even better fluid loss additive and filter cake former.

There are a number of composition embodiments of the Invention. In the simplest embodiment, sized particles, beads, fibers, platelets or ribbons (or other shapes) of solid acid-precursor are mixed with sized particles of calcium carbonate in a drill-in fluid. It is also within the scope of the Invention to manufacture particles that contain both the solid acid-precursor and the acid-soluble particulate material, for example to co-extrude (and optionally then to comminute) mixtures of calcium carbonate and solid acid-precursor in particles, fibers, platelets or ribbons that are used for this function. Calcium carbonate or other solid acid-reactive material coated with solid acid-precursor may also be used. In these uses, the tightness of the packing of the particles in the filter-cake may also be used to control the rates of generation of acid and dissolution of particles by affecting local concentrations of reactants and products, convection, and other factors.

Another advantage to the use the mixtures of the Invention in fluid loss additives and filter cakes is that the acid generated in the self-destruction process may function as a breaker for polymeric or viscoelastic surfactant viscosifying agents. Acids are known to damage or destroy synthetic polymers and biopolymers used to viscosify drilling, completion and stimulation fluids. Acids are also known to damage or destroy either the micelle/vesicle structures formed by viscoelastic surfactants or, in some cases, the surfactants themselves.

When solid acid-precursors or mixtures of solid acid-precursors and solid acid-reactive materials are used in fluids in such treatments as drilling, drill-in, completion, stimulation (for example, hydraulic fracturing or matrix dissolution), sand control (for example gravel packing, frac-packing, and consolidation), diversion, and others, the solid acid-precursor or mixture of solid acid-precursor and solid acid-reactive material are initially inert to the other components of the fluids, so the other fluids may be prepared and used in the usual way. Normally, such fluids already contain a fluid loss additive and filter cake former, so the solid acid-precursor or mixture of solid acid-precursor and solid acid-reactive material replace some or all of the fluid loss additive and filter cake former that would otherwise have been used. In many cases, if the fluid contains a component that would affect or be affected by the solid acid-precursor or mixture of solid acid-precursor and solid acid-reactive material (such as a buffer, another acid-reactive material, or a viscosifier that forms or is incorporated in filter cakes), either the amount or nature of the solid acid-precursor or mixture of solid acid-precursor and solid acid-reactive material or the amount or nature of the interfering or interfered-with component may be adjusted to compensate for the interaction. This may readily be determined by simple laboratory experiments.

Although the compositions and method embodiments of the Invention are described in terms of producing wells for oil and/or gas, the compositions and methods have other uses, for example they may also be used in injection wells (such as for enhanced recovery or for storage or disposal) or in production wells for other fluids such as carbon dioxide or water.

EXAMPLE 1

Lactic acid is not as commonly used as an acid in oilfield treatments as are formic, acetic and citric acids. Tests were run to determine the capacity of lactic acid in the dissolution of calcite at 82° C. FIG. 1 shows the concentration of calcite in ppm dissolved by reagent grade lactic acid as a function of weight percent acid in water. Lactic acid has a capacity for dissolving calcite that is similar to acetic acid or formic acid, and much higher than citric acid. These tests demonstrate that lactic acid generated from a lactate polymer is effective for dissolution of calcium carbonate.

EXAMPLE 2

Experiments were performed (Table 1) to evaluate the hydrolysis rate of PLA and to compare the hydrolysis rates of PLA with and without added calcite. The PLA was NATUREWORKS™ PLA Polylactide Resin 4042D, a polymerized mixture of D- and L-lactic acid, available from Cargill Dow, Minnetonka, Minn., USA. The material was used as approximately 4 mm diameter beads. The calcite was reagent grade powder. 45.04 Grams PLA and 20 grams calcite, when used, were added to 500 ml distilled water. The time shown is the time for 100% hydrolysis.

TABLE 1

| Composition | 121° C. | 135° C. | 149° C. |
| --- | --- | --- | --- |
| PLA | Dissolves in greater than 2 hours | Dissolves in greater than 2 hours | Dissolves in less than 2 hours |

TABLE 1-continued

| Composition | 121° C. | 135° C. | 149° C. |
| --- | --- | --- | --- |
| PLA + Calcite | Dissolves in greater than 2 hours 30 minutes | Dissolves in less than 2 hours 30 minutes | Dissolves in less than 45 minutes |
| Calcite | Insoluble | Insoluble | Insoluble |

These results show that this solid acid-precursor hydrolyses and dissolves at a rate suitable for use as a self-destructive fluid loss additive and filter cake former. Furthermore, calcite, which is insoluble in water under these conditions, accelerates the rate of PLA hydrolysis and is itself dissolved in the generated acid.

EXAMPLE 3

Experiments were run to determine the suitability of various materials as fluid loss additives. Experimental conditions and results are shown in Table 2. Berea sandstone cores (2.54 cm long and 2.54 cm in diameter) were mounted in an API static fluid loss cell. Cores were flushed with 2% KCl brine, heated to the indicated temperature, and the permeability to the brine was determined at a flow rate of 5 ml/min. Then the indicated fluid was injected at a constant pressure of 6.895 MPa. The weight of effluent fluid was determined with a balance and recorded as a function of time. Leak-off was characterized in two ways: the "spurt", which was the initial rapid leak-off of fluid before a filter cake barrier was formed on the core face (indicated by the grams fluid leaked off in the first 30 seconds), and, "wall", which was the subsequent leak-off that occurred even after a filter cake was formed (indicated by the grams per minute of fluid leaked off between 15 and 30 minutes).

All concentrations shown in Table 2 are in weight percent. The surfactant used in all experiments was obtained from the supplier (Rhodia, Inc. Cranbury, N.J., U.S.A.) as Mirataine BET-E-40; it contains 40% active ingredient (erucylamidopropyl betaine), with the remainder being substantially water, sodium chloride, and isopropanol. The MgO used was MagChem 35, obtained from Martin Marietta Magnesia Specialties LLC, Baltimore, Md., USA. It has a mean particle size of 3 8 microns. The PGA used was Dupont TLF 6267, described by the supplier as a crystalline material having a molecular weight of about 600 and a mean particle size of about 8 to 15 microns. The Al(OH)$_3$ used was obtained from Aldrich. It has a mean particle size of about 40 microns. The PCA and the solid acid-reactive materials were added as separate particles. The buffer used in Experiment 25 was sodium sesquicarbonate.

These data show that all the mixtures of PGA and magnesium oxide, sized calcium carbonate, or aluminum hydroxide are excellent fluid loss additives and form filter cakes that very effectively reduce flow through these cores. (Without the additives, the flow through a 100 mD core would be greater than 100 g in a 30 minute test.) The fluid loss additives and filter cake formers are effective at various total concentrations and ratios of solid acid-precursor to solid acid-reactive material, in cores having a broad range of quite high permeabilities, and at several temperatures. They reduce both the spurt and the subsequent leak-off. Furthermore, when the composition of the Invention is used, a lower concentration of surfactant may be required.

TABLE 2

| Test ID | Run | Formulation | Temp. | Perm | g/30 min | "Spurt" g | "Wall" g/min |
|---|---|---|---|---|---|---|---|
| 7598-11 | 1 | 3% Surfactant + 0.5% PGA + 0.4% MgO | 65.6 C. | 167 mD | 17 | | |
| 7598-113 | 2 | 3% Surfactant + 0.5% PGA + 0.4% MgO | 65.6 | 137 | 23 | | |
| 7598-114 | 3 | 3% Surfactant + 0.5% PGA + 0.4% MgO | 65.6 | 152 | 11 | 2 | 0.29 |
| 7598-115 | 4 | 3% Surfactant + 0.5% PGA + 0.4% MgO | 65.6 | 106 | 13 | | |
| 7598-17 | 5 | 6% Surfactant + 0.5% PGA + 0.4% MgO | 65.6 | 235 | 12 | | |
| 7598-171 | 6 | 3% Surfactant + 0.5% PGA + 0.4% MgO | 65.6 | 230 | 22 | | |
| 7598-172 | 7 | 3% Surfactant + 0.5% PGA + 0.4% MgO | 65.6 | 210 | 34 | | |
| 7598-18 | 8 | 6% Surfactant + 0.5% PGA + 0.4% MgO | 65.6 | 209 | 11 | | |
| 7598-19 | 9 | 6% Surfactant + 0.5% PGA + 0.4% MgO | 65.6 | 211 | 31 | | |
| 7598-21 | 10 | 6% Surfactant + 0.5% MgO | 65.6 | 125 | 23 | 7.5 | 0.37 |
| 7598-231 | 11 | 6% Surfactant + 0.2% PGA + 0.4% MgO | 65.6 | 42 | 5.5 | | |
| 7598-232 | 12 | 6% Surfactant + 0.2% PGA + 0.4% MgO | 65.6 | 171 | 6 | 2 | 0.088 |
| 7598-233 | 13 | 6% Surfactant + 0.2% PGA + 0.4% MgO | 65.6 | 306 | 7 | | |
| 7598-24 | 14 | 3% Surfactant + 0.2% PGA + 0.4% MgO | 65.6 | 246 | 19 | | |
| 7598-25 | 15 | 6% Surfactant + 0.2% PGA + 0.4% MgO | 93.3 | 29 | 7 | | |
| 7598-251 | 16 | 6% Surfactant + 0.2% PGA + 0.4% MgO | 93.3 | 126 | 7.5 | | |
| 7598-252 | 17 | 6% Surfactant + 0.2% PGA + 0.4% MgO | 93.3 | 299 | 9.5 | | |
| 7598-28 | 18 | 3% Surfactant + 0.2% PGA + 0.4% MgO | 93.3 | 51 | 17 | | |
| 7598-281 | 19 | 3% Surfactant + 0.2% PGA + 0.4% MgO | 93.3 | 119 | 18 | | |
| 7598-29 | 20 | 3% Surfactant + 0.2% PGA + 0.4% MgO | 93.3 | 300 | 20 | | |
| 7598-31A | 21 | 3% Surfactant + 0.2% PGA + 0.4% CaCO3 (2 micron) | 65.6 | 48 | 29 | 7.5 | 0.52 |
| 7598-31B | 22 | 3% Surfactant + 0.2% PGA + 0.4% CaCO3 (10 micron) | 65.6 | 40 | 26 | | |
| 7598-31C | 23 | 6% Surfactant + 0.2% PGA + 0.4% CaCO3 (10 micron) | 65.6 | 43 | 11 | 2.5 | 0.21 |
| 7598-31D | 24 | 3% Surfactant + 0.2% PGA + 0.4% CaCO3 (2 micron) + 0.15% MgO | 65.6 | 107 | 31 | | |
| 7599-39B | 25 | 3% Surfactant + 0.2% PGA + 0.4% Al(OH)3 + 0.2% Buffer | 65.6 | 117 | 34 | 6 | 0.64 |
| 7598-39C | 26 | 3% Surfactant + 0.2% PGA + 0.4% Al(OH)3 | 65.6 | 128 | 74 | 8 | 1.25 |

The invention claimed is:

1. An oilfield treatment method in which a filter cake is formed and at least partially destroyed on a subterranean formation surface, the method comprising:
   a. preparing an oilfield treatment fluid comprising:
      i. a solid acid-precursor, the solid acid-precursor coated with a hydrolysis-delaying material, and
      ii. a solid acid-reactive material;
   b. injecting said oilfield treatment fluid into a wellbore penetrating said formation, causing said fluid to contact said formation surface;
   c. forming a filter cake on said formation surface; and
   d. allowing at least a portion of said solid acid-precursor to hydrolyze, provided that the mixture of the solid acid-precursor and the solid acid-reactive material is not a combined mixture, wherein the solid acid-reactive material is incorporated in an amount such that when the mixture contacts water, hydrolysis of the solid acid-precursor is accelerated, and wherein the solid acid-reactive material neutralizes and is dissolved by the acid generated due to the hydrolysis of the solid acid-precursor.

2. The method of claim 1 wherein the solid acid-reactive material is substantially insoluble in water.

3. The method of claim 2 wherein the solid acid-reactive material is selected from the group consisting of magnesium hydroxide, calcium carbonate, aluminum hydroxide, calcium oxalate, calcium phosphate, aluminum metaphosphate, sodium zinc potassium polyphosphate glass, and sodium calcium magnesium polyphosphate glass.

4. The method of claim 1 wherein the treatment is selected from drilling, drill-in, completion, hydraulic fracturing, diversion, scale control, water control, matrix dissolution, sand consolidation, frac-packing, and gravel packing.

5. The method of claim 1 wherein the solid acid-precursor and the solid acid-reactive material is a physical mixture of particles.

6. The method of claim 1 wherein the solid acid-reactive material is soluble in water.

7. The method of claim 1 wherein the solid acid-reactive material is boric acid or borax.

8. The method of claim 1 wherein the solid acid-precursor is selected from the group consisting of lactide, glycolide, polylactic acid, polyglycolic acid, copolymers of polylactic acid and polyglycolic acid, copolymers of glycolic acid with other hydroxy-, carboxylic acid-, or hydroxycarboxylic acid-containing moieties, copolymers of lactic acid with other hydroxy-, carboxylic acid-, or hydroxycarboxylic acid-containing moieties, and mixtures thereof.

9. The method of claim 1 wherein the solid acid-precursor surrounding the solid acid-reactive material is coated with a hydrolysis-delaying material.

10. The method of claim 1 wherein the solid acid-precursor is selected from the group consisting of lactide, polylactic acid, and mixtures thereof.

11. The method of claim 1 wherein the solid acid-precursor and the solid acid-reactive material is capable of forming a self-destructing filter cake on the surface of a formation penetrated by a wellbore.

12. The method of claim 1 wherein the solid acid-reactive material is boric acid or borax.

13. A method for forming and at least partially destroying a filter cake comprising the steps of formulating a fluid comprising a composition comprising a solid acid-precursor coated with a hydrolysis-delaying material, and a solid acid-reactive material, causing said fluid to contact a surface, and allowing said solid acid-precursor to hydrolyze, wherein the solid acid-reactive material is incorporated in an amount such that when the mixture contacts water, hydrolysis of the solid acid-precursor is accelerated, and wherein the solid acid-reactive material neutralizes and is dissolved by the acid generated due to the hydrolysis of the solid acid-precursor, provided that the mixture of the solid acid-precursor and the solid acid-reactive material is not a combined mixture.

14. The method of claim 13 wherein the solid acid-precursor and the solid acid-reactive material is a physical mixture of particles.

15. The method of claim 14 wherein the solid acid-precursor surrounding the solid acid-reactive material is coated with a hydrolysis-delaying material.

16. The method of claim 13 wherein the solid acid-reactive material is substantially insoluble in water.

17. The method of claim 16 wherein the solid acid-reactive material is selected from the group consisting of magnesium hydroxide, calcium carbonate, aluminum hydroxide, calcium oxalate, calcium phosphate, aluminum metaphosphate, sodium zinc potassium polyphosphate glass, and sodium calcium magnesium polyphosphate glass.

18. The method of claim 13 wherein the solid acid-precursor is selected from the group consisting of lactide, glycolide, polylactic acid, polyglycolic acid, copolymers of polylactic acid and polyglycolic acid, copolymers of glycolic acid with other hydroxy-, carboxylic acid-, or hydroxycarboxylic acid-containing moieties, copolymers of lactic acid with other hydroxy-, carboxylic acid-, or hydroxycarboxylic acid-containing moieties, and mixtures thereof.

19. The method of claim 13 wherein the solid acid-precursor is selected from the group consisting of lactide, polylactic acid, and mixtures thereof.

* * * * *